June 17, 1941.　　J. C. McCUNE ET AL　　2,246,214
BRAKE MECHANISM
Original Filed Jan. 31, 1939　　2 Sheets-Sheet 1
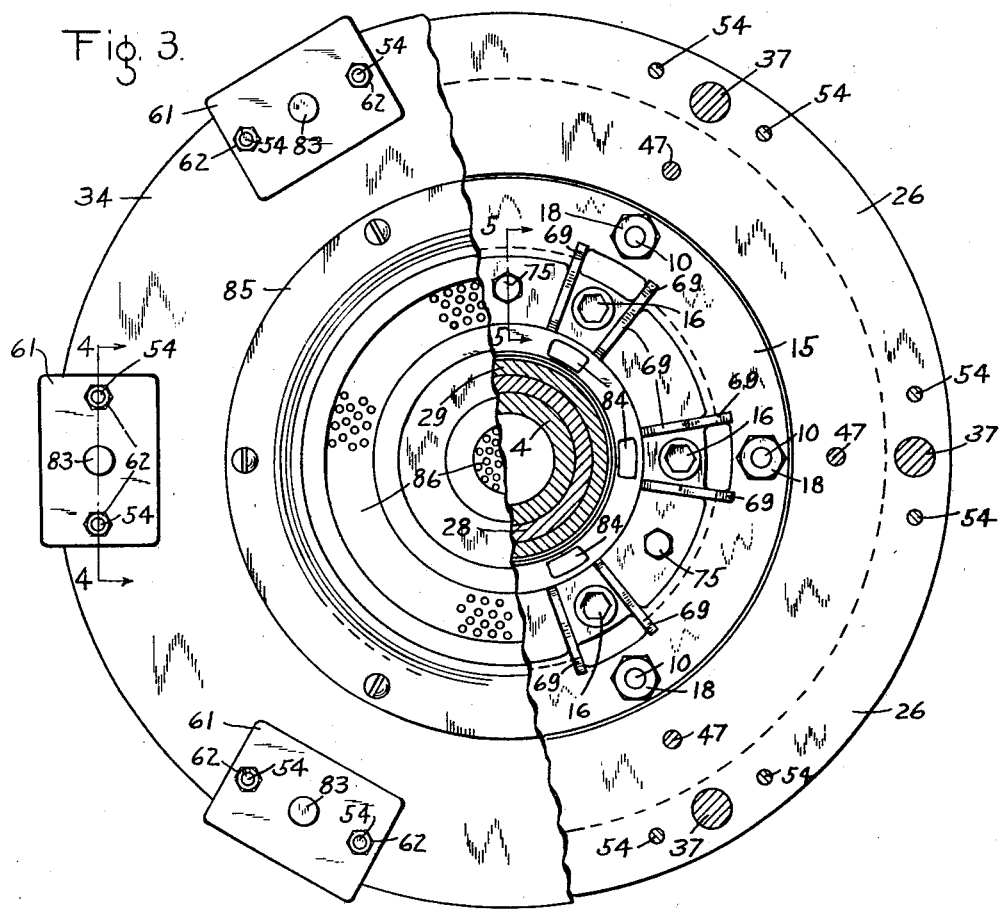
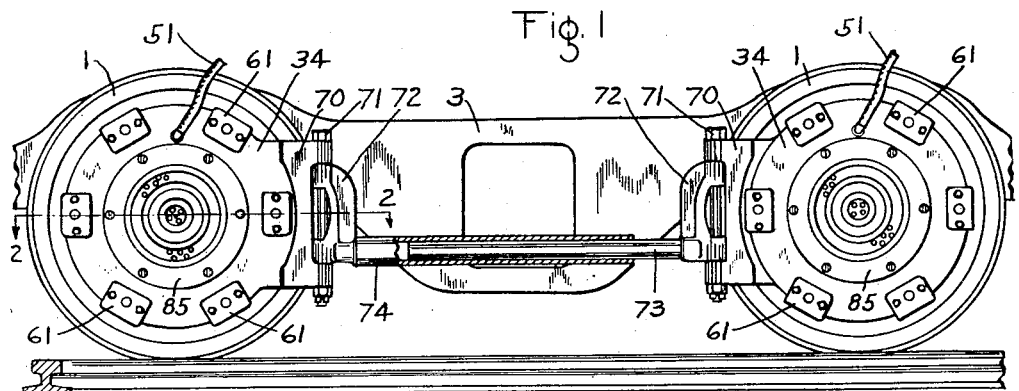
INVENTORS
JOSEPH C. McCUNE
GEORGE K. NEWELL
BY
ATTORNEY

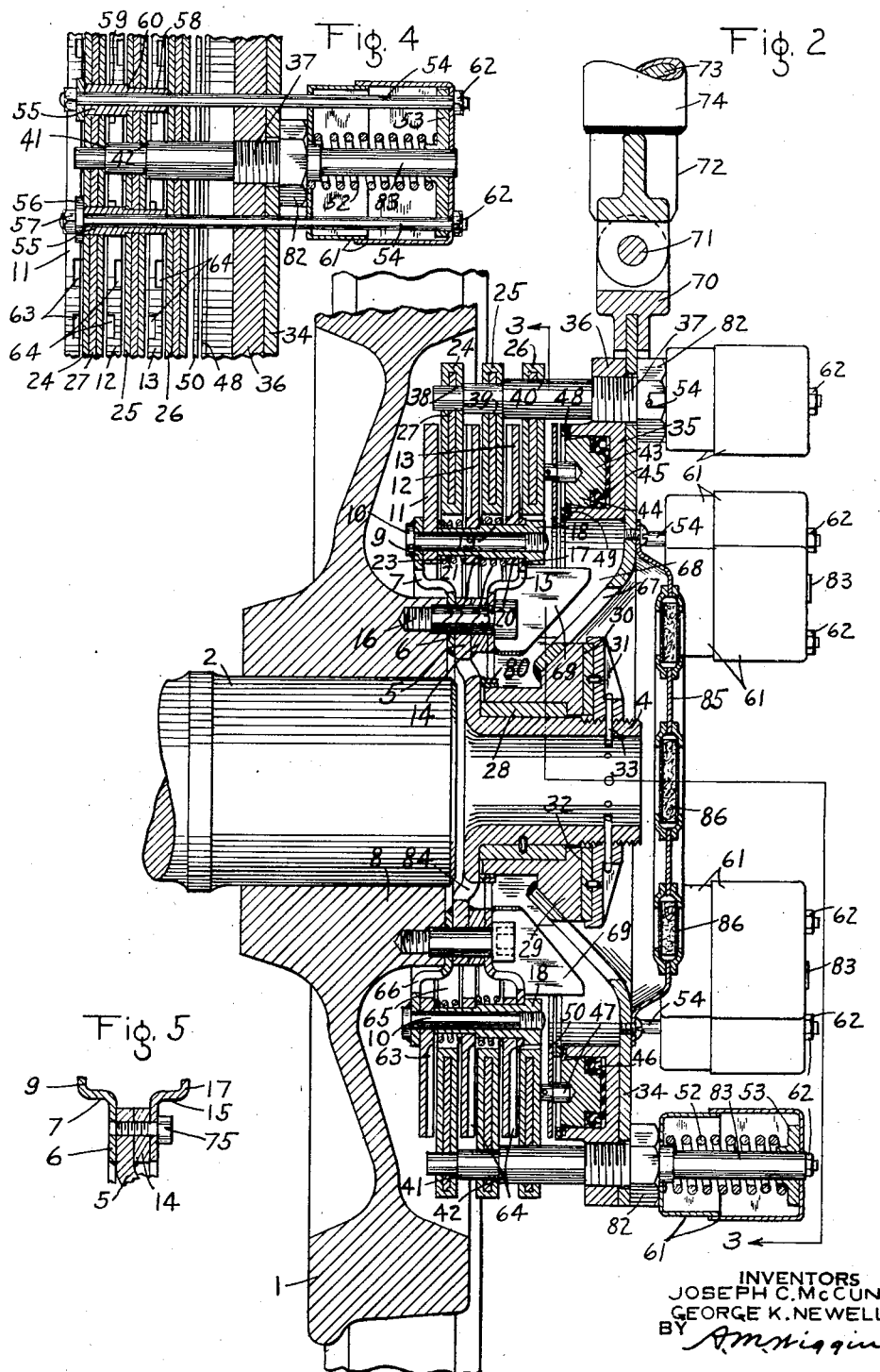

Patented June 17, 1941

2,246,214

UNITED STATES PATENT OFFICE 2,246,214

BRAKE MECHANISM

Joseph C. McCune, Edgewood, and George K. Newell, near Pitcairn, Pa., assignors to The Westinghouse Air Brake Company, Wilmerding, Pa., a corporation of Pennsylvania Original application January 31, 1939, Serial No. 253,771. Divided and this application June 29, 1939, Serial No. 281,892

2 Claims. (Cl. 188—59)

This invention relates to brake mechanism and more particularly to the disc type for use on railway vehicle trucks; the present application being a division of my pending application Serial No. 253,771, filed January 31, 1939.

A disc brake mechanism comprises interleaved rotatable and non-rotatable braking elements and in applying same to railway vehicle trucks, it is proposed to associate at least one such mechanism with each of the wheel and axle assemblies of the truck, with the rotatable brake elements of the mechanisms secured to the wheel and axle assemblies so as to rotate therewith. It is essential that the non-rotatable brake elements of the mechanisms be held against rotation in order to provide braking of the wheel and axle assemblies upon being forced into frictional interengagement with the rotatable brake elements. This may be accomplished by connecting the non-rotatable elements to the truck frame, but in such an arrangement the force applied to the frame for holding the non-rotatable elements against rotation will interfere to some extent with the springing of the frame.

The principal object of the present invention is therefore to provide means, which are operative independently of the truck frame, to secure the non-rotatable elements of the disc brake mechanisms against rotation.

This object is attained by connecting the non-rotatable brake element or elements associated with one wheel and axle assembly of the vehicle truck with those associated with another wheel and axle assembly of said truck in such a manner, and wholly independent of the truck frame, that the tendency for the non-rotatable elements in one mechanism to turn is opposed and counteracted by the tendency to turn of the non-rotatable brake elements of the other brake mechanism. By this arrangement, braking of the truck is entirely independent of the truck frame so that the frame is as free for vertical movement relative to the wheel and axle assemblies when the brakes on the truck are applied as when the brakes are released.

Other objects and advantages will appear from the following more detailed description of the invention.

In the accompanying drawings; Fig. 1 is a side elevational view of a vehicle truck showing in end elevation the improved brake mechanism applied to the two wheels at the one side of the truck; Fig. 2 is a horizontal sectional view of the improved brake mechanism and one wheel of the vehicle truck taken on the line 2—2 in Fig. 1; Fig. 3 is a sectional view taken substantially on the line 3—3 in Fig. 2; Fig. 4 is a side elevational view of a portion of the brake mechanism taken on the line 4—4 in Fig. 3; and Fig. 5 is a sectional view taken on the line 5—5 in Fig. 3.

General description

As shown in the drawings, the improved brake mechanism is associated with a truck of a railway vehicle which, for the purpose of illustration, is of the type comprising a pair of longitudinally spaced wheels 1, an axle 2 for each of said wheels and a truck frame 3 disposed inboard of said wheels and adapted to be supported on said axle in any desired manner (not shown).

An improved brake mechanism constructed in accordance with the invention is adapted to be associated with each of the wheels 1 at one side of the truck, as shown in Fig. 1. Both of these brake mechanisms are of identical structure and the following detailed description of one will therefore apply to both.

Description of disc brake mechanism

The disc brake mechanism embodying the invention comprises a support member, preferably in the form of a cylindrical sleeve 4, disposed adjacent the outer end of axle 2 and in axially alignment therewith and having adjacent the end of the axle an outwardly extending flange 5 to the outer face of which is secured by welding the inner peripheral flange 6 of a torque ring 7 provided for engagement with the outer end of the wheel hub 8. The torque ring 7 is bent inwardly toward the wheel 1 and is provided with an outer radial flange 9 to which there is secured a plurality of spaced torque pins 10. The torque pins 10 are preferably in the form of bolts extending through the torque ring flange 9 away from the wheel 1 and with the heads of said bolts welded to said flange.

Encircling the torque pins 10 are a plurality of annular, rotatable friction brake elements 11, 12 and 13 each of which is provided adjacent the inner periphery with suitable bores through which the torque pins 10 extend. These brake elements are arranged in the order described with the rotatable element 11 having a sliding fit on the torque pins 10 and bearing against the torque ring 7.

A spacer ring 14 is secured by welding to the outer face of flange 5 on the support member 4 and removably mounted against the opposite face of said spacer is a torque ring 15 which may be identical to but disposed oppositely from the torque ring 7. A plurality of bolts 16 are provided which extend through suitably aligned apertures in the inner, radial flange of the torque ring 15, the spacer 14, the flange 5 of the support member 4 and the inner flange 6 of the torque ring 7 into the hub 8 of wheel 1, wherein said bolts have screw-threaded engagement for rigidly securing the elements just enumerated to the wheel 1 so as to rotate therewith. There are also provided two or more assembling screws 75 disposed in spaced relation and extending through the torque ring 15 and spacer 14 and having screw-threaded engagement with the flange 5 (Fig. 5), the purpose of which will be later brought out.

The torque ring 15 has a radial flange 17 disposed opposite the flange 9 on the torque ring 7 and provided with suitable apertures through which the several torque pins 10 extend, it being noted that the inside face of the flange 17 is arranged for engagement by the rotatable brake element 13. A nut 18 is provided on the outer end of each of the torque pins 10 and is screwed up against the adjacent face of the torque ring 15. Each of the nuts 18 is provided with a sleeve 19 which extends through the flange 17 of the torque ring 15 and bears against the rotatable brake element 11 for holding same against the torque ring 7.

Each of the sleeves 19 is formed with two cylindrical supports or guides 20 and 21 of different diameters stepped down in the direction of the rotatable brake element 11. The rotatable brake element 12 is slidably mounted on the guides 21 of smaller diameter while the rotatable brake element 13 is slidably mounted on the guides 20 of larger diameter. A shoulder 22 formed at the junction of the guides 20 and 21 on each of the sleeves 19 is adapted to act as a stop for engagement by the rotatable brake element 12 to limit its movement in a direction away from the wheel 1 and to thereby define its release position which it is adapted to assume when the brake mechanism is in its released condition. When the brake mechanism is in this condition the rotatable brake element 13 is adapted to engage the torque ring 15. In order to move the rotatable brake elements 12 and 13 to their release positions, just described, a spring 23 is provided on each of the cylindrical guides 21 acting on the rotatable element 12 for moving same against the shoulder 22, while a like spring 23' is provided on each of the cylindrical guides 20 to act on the rotatable brake element 13 for moving it against the adjacent face of the torque ring 15.

A plurality of annular non-rotatable friction brake discs or elements 24, 25 and 26 are interleaved with the rotatable brake elements 11, 12 and 13, the non-rotatable element 24 being disposed between the rotatable elements 11 and 12, the non-rotatable element 25 being disposed between the rotatable elements 12 and 13, while the non-rotatable element 26 is disposed adjacent the outer face of the rotatable element 13.

Each of the non-rotatable brake elements 24, 25 and 26 is of greater outside diameter than the rotatable brake elements, for reasons which will be later brought out, and each preferably comprises an annular ring-like core 27, preferably made of steel, embedded, during a process of casting, in cast iron so as to provide on each of the opposite faces of said core a cast iron braking surface for engagement with the adjacent faces of the rotatable brake elements.

A bearing ring 28, made of any suitable self-lubricating material, is mounted on the support member 4 against the radial flange 5 in axial alignment with the wheel 1 and rotatable brake elements. A support element 29 is journaled on the bearing ring 28 and is provided at its outer end with a radial bearing face 30. A nut 31 is mounted on the end of the support member 4 and has screw-threaded engagement therewith. To the inner face of this nut is secured an annular bearing ring, also made of any desired self-lubricating material, and provided with a radial bearing face 32 adapted to engage the face 30 on the end of the element 29 for holding said element against axial movement relative to the sleeve 4. The nut 31 is adjustable on the sleeve 4 to secure the support element 29 against axial movement on the bearing ring 28 and is locked in this adjusted position by means of one or more cotter keys 33 extending through suitably aligned openings in said nut and in the sleeve 4. A resilient sealing ring 80 is secured around the inner end portion of element 29 and bears against the flange 5 to prevent dirt entering the bearing between said element and the bearing ring 28.

A support ring or disc 34 is provided having a centrally, inturned portion encircling and secured by welding to the support element 29. An annular brake cylinder device 35, is mounted against the inner face of the disc 34 in coaxial relation with the braking elements. The brake cylinder device 35 is encircled by an annular flange 36 having a plurality of spaced, screw-threaded bores, and extending through the disc 34 and having screw-threaded engagement in these bores are a plurality of spaced support rods 37. Each of these rods is provided with a head 82 for engaging the outer face of the disc 34, whereby upon tightening said rods, the brake cylinder device is secured to the disc 34 in coaxial relation with the rotatable brake elements.

Each of the support rods 37 extends beyond the brake cylinder device 35 and is provided with suitable cylindrical guides 38, 39 and 40 of different diameters stepped down in the direction of the ends of said rod and upon which are slidably mounted the non-rotatable brake elements 24, 25 and 26, respectively. These guide sections 38, 39 and 40 provide shoulders 41 and 42 for engagement by the non-rotatable elements 24 and 25, respectively, to limit movement thereof in the direction away from the wheel 1 and for thereby defining the release position of said elements substantially midway between the adjacent rotatable brake elements when said rotatable brake elements are in their release positions above described.

The annular brake cylinder device 5 comprises a casing having an annular piston bore open at the side facing the non-rotatable element 26. An annular ring-like brake cylinder piston 43 is slidably mounted in this bore and comprises a pressure head 44 and a flexible packing cup 45 secured to the end of said head more remote from the wheel 1. In front of the packing cup 45 there is provided a chamber 46 which is connected to a pipe 51 through which fluid under pressure is adapted to be supplied to and released from said chamber in any desired manner for controlling reciprocation of the brake cylinder piston, in a manner to be later described.

The piston head 44 is provided at the opposite end with a plurality of spaced pressure pins 47 projecting from said head and engaging the outer face of the non-rotatable brake element 26. With the brake cylinder piston in its innermost position engaging the end of the piston bore, the pressure pins 47 engaging the non-rotatable element 26 are adapted to define the release position of said element in which it is spaced from the rotatable brake element 13.

Both the inner and outer peripheral surfaces of the piston head 44 are tapered towards each other and thus away from the side walls of the piston bore from a point adjacent the packing cup 45, in order to prevent said head binding in its bore upon movement thereof in the direction of the brake elements in case one portion of the head starts moving ahead of a diametrically opposite portion.

A ring 48 made of felt or the like is secured to the brake cylinder casing and has wiping engagement with the outer peripheral surface of the brake cylinder piston 43, while a similar ring 49 is secured to said casing and has wiping contact with the inner peripheral surface of said piston. These felt rings are provided for preventing the entrance of dirt or other foreign material into the brake cylinder bore and also for holding lubricant in said bore and spreading same upon the walls of the piston during reciprocation thereof.

It will be noted that the non-rotatable brake element 26 is spaced from the brake cylinder piston 43 and the casing in which it operates by the pins 47, and disposed in this space and preferably supported on said pins for movement therewith is an annular ring 50 of substantially the same inside and outside diameters as the brake cylinder device 35. This ring 50 is provided to act as a shield for the brake cylinder device to prevent the transfer of heat developed in the brake elements, incident to braking, to the brake cylinder device wherein excessive heat would tend to destroy the lubricant for the brake cylinder piston 43 and also the packing cup 45. The ring 50 is preferably provided on the face adjacent the brake element 26 with a highly polished surface adapted to reflect heat back toward said element and thus away from the brake cylinder piston 43. This ring is also made of a material, such as copper or an alloy thereof, which has the property of quickly giving up absorbed heat, for reasons which will be later brought out.

Each of the rods 37 is provided with a projection 83 which extends from the head 82 thereof, and encircling and mounted on each of these projections is a coil spring 52 supported at its inner end on the head 82. The outer end of each of the springs 52 bears against a follower 53 which is slidably mounted on the projection 83. A pair of release rods 54, disposed one at each of the opposite sides of each of the springs 52, are secured at one end to the followers 53 and extend in the direction of the wheel 1 through suitably aligned apertures in the disc 34, the flange 36 on the brake cylinder device and the non-rotatable brake elements 24, 25 and 26 outside of the peripheries of the rotatable brake elements. These rods are free to move through the disc 34 and brake cylinder flange 36 and having a sliding fit in the apertures through the non-rotatable element 26.

A sleeve 55 is mounted on the end of each of the rods 54 closest to the wheel 1 and held in place by a washer 56 and a nut 57 having screw-threaded engagement with the rod. Each of the sleeves 55 is provided with two cylindrical guide portions 58 and 59 having sliding fits in the apertures through the non-rotatable elements 25 and 24, respectively. The guide portion 59 is of larger diameter than the guide portion 58 and cooperates therewith to form an annular shoulder 60 adapted to engage the non-rotatable element 25 for effecting movement thereof in a direction away from the wheel 1. The washer 56 engaging the outer end of each of the sleeves 55 is provided for engaging the non-rotatable element 24 for effecting movement thereof in the same direction, while like movement of the non-rotatable element 26 is adapted to be effected by engagement with the smaller end of the sleeves 55.

The washers 56, the shoulders 60 on the sleeves 55, the smaller ends of said sleeves and the position of the brake cylinder piston 43 in the brake cylinder device are all so related that upon movement of the rods 54 in the direction away from the wheel, to a position in which said piston engages the end of the cylinder bore, the several non-rotatable elements are adapted to be disengaged and spaced away from the rotatable elements and thus assume their brake release positions. The springs 52 are provided to act through the followers 53 and rods 54 to move the non-rotatable brake elements and the brake cylinder piston to their release positions just described.

Each spring 52 and the associated rods 54 are preferably enclosed in a casing comprising two oppositely disposed cup shaped members 61 having telescopic engagement one with the other. One of the cup shaped members enclosing each spring 52 is secured in place between the head 82 on one of the rods 37 and the adjacent end of said spring, while the other cup shaped member is slidably mounted on the projection 83 of said rod and is secured against the outer face of the follower 53 by nuts 62 provided on the outer ends of the rods 54 which extend through the end of the cup.

As will be evident, the nuts 62 act to hold the outer cup shaped members 61 in place and by the adjustment of said nuts on said rods the pressure of the springs 52 acting through the rods 54 on the non-rotatable brake elements and brake cylinder piston may be adjusted to provide that required for urging said elements and piston to their release position, above described.

A brake cylinder piston of the type embodied in the present invention has a relatively high resistance to movement in the direction for effecting a release of the brakes, but in the present invention a sufficient force for effecting such movement is insured by the springs 52 located at one side of the brake mechanism, since such springs can be designed to provide the required operating characteristics which would be difficult to obtain with relatively small springs confined in limited spaces, such as the springs 23 and 23' acting on the rotatable brake elements.

The rotatable brake element 11 is provided in its braking face with a plurality of radially arranged slots 63 while the rotatable braking elements 12 and 13 are provided in both of their braking faces with corresponding slots 64 which in one face of each of the elements 12 and 13 are staggered with respect to those in the opposite face. The slots 63 and 64 open through the outer peripheral face of the rotatable brake elements to the atmosphere, while the inner ends of said slots open past the inner peripheral faces of the non-rotatable brake elements 24 and 25 to a chamber 65. The chamber 65 is formed between the torque rings 7 and 15 and is open to the atmosphere through a plurality of apertures 66 provided in the torque ring 7. A chamber 68 formed between the rotatable and non-rotatable torque rings 15 and 34 is open to the space between the non-rotatable brake element 26 and the brake cylinder device 35 in which space the cooling ring 50 is disposed. A plurality of fan blades 69 disposed in chamber 68 are secured to the torque ring 15 so as to rotate therewith for forcing air from said chamber through the space between the non-rotatable brake element 26 and brake cylinder device over both faces of the cooling ring 50. The chamber 68 is open to the atmosphere through apertures 84 in the flange 5 of the support member 4 and from thence through the axial bore in said member, and also through apertures 67 in the disc 34. A cover 85, provided with one or more air strainers 86 is secured to the disc 34 over the apertures 67 and the end of the support member 4 for removing foreign matter from the air before it enters chamber 68 to further protect the axial and radial bearings of the support element 29.

One or more of the apertures 67 are so located that the securing bolts 16 may be placed in position or removed from outside of the brake mechanism and so that a wrench may be inserted through the disc 34 to said bolts for tightening and loosening same.

A member 70 is secured, preferably by welding, to the edge of the stationary torque ring 34 at one side of the axle 1. This member is provided with a vertically arranged bore in which there is disposed a pin 71 pivotally connecting said member to a member 72. The member 72 connected to one of the brake mechanisms at one side of the truck is secured to one end of a rod 73, while the member 72 connected to the other brake mechanism at that side of the truck is connected to one end of a sleeve 74, said rod being telescoped within said sleeve to permit relative movement of the two brake mechanisms longitudinally of the truck frame with the wheels to which they are connected. The pins 71 are provided in this connection to permit movement of the two brake mechanisms relative to each other in a direction transversely of the truck frame.

*Assembling of the brake mechanism*

Each of the brake mechanisms is adapted to be assembled as a unit on a bench or the like remote from the vehicle to which it is to be applied and then applied to the vehicle as a unit, following which the connection embodying the pins 71, members 72, rod 73 and sleeve 74 are applied connecting the two mechanisms together.

The assembling of each brake mechanism is accomplished in the following manner; the various parts hereinbefore described as being welded together having already been secured in their proper working relation. The several rotatable brake elements and the non-rotatable brake elements 24 and 25 are first assembled in their proper relation on the torque pins 10 inserting the springs 23 and 23' on said pins during this operation. The torque ring 15 is next placed in position and rigidly secured to the flange 5 of the support member 4 by the assembling screws 75.

The several support rods 37 are next inserted through the apertures in the support disc 34 and screwed into the flange 36 of the brake cylinder device securing said device to said ring. The brake cylinder piston 43 having mounted thereon the packing cup 45 and being provided with the torque pins 47 carrying the ring 50 is then inserted into the casing of the brake cylinder device. Next the non-rotatable brake element 26 is slipped on to the several rods 37 to its working position.

The assembly of parts just described in then slipped over the end of the support member 4 to its working position against the flange 5 on the support member 4, and during such movement the apertures in the non-rotatable elements 25 and 24 are lined up for reception of the guide sections 39 and 38 on the rods 37. The nut 31 is then screwed on to the end of the support member 4 to its properly adjusted position in which the cotter keys 33 are applied.

The release springs 52, followers 53, cup shaped members 61 and rods 54 are next mounted in place on the projections 83 of rods 37, the rods 54 being threaded through the apertures in the support disc 34, the flange 36 of the brake cylinder device and the several non-rotatable brake elements. The sleeves 55 are then slipped into place on the rods 54 and secured by the washers 56 and nuts 57. The nuts 62 are now adjusted to provide the proper tension on springs 52 for moving the non-rotatable brake elements and brake cylinder piston to their release position.

All of the various parts of the brake mechanism except the cover 85 are now assembled into a unit in their proper working relation as will be evident and in order to mount said unit on the wheel 1 it is placed in position against the end of the wheel hub 8. The securing bolts 16 are then inserted through the apertures 67 in the support disc 34 and into the apertures extending through the torque ring 15, spacer ring 14, flange 5 of the support member 4 and torque ring 7 into the bores in the wheel hub 8 in which said bolts have screw-threaded engagement. The bolts 16 are then screwed home by a wrench inserted through the apertures 67 thereby rigidly securing the brake mechanism to the wheel 1. After the brake mechanism is applied to the wheel as just described the assembling screws 75 serve no further useful purpose, the only purpose of these screws being to hold certain parts of the mechanism in an assembled condition prior to application to the car wheel. The assembling screws 75 may however be left in place after the brake mechanism is applied to the wheel if such is desired. After the bolts 16 are properly tightened the cover 85 is secured in place.

After a brake mechanism is applied to each of the two wheels at one side of a truck in the manner just described the two mechanisms are operatively connected together by the pins 71, members 72 and the rod 73 and sleeve 74 assembled in telescopic relation.

*Operation of the brake mechanism*

After a brake mechanism has been applied to each of the two wheels at one side of a truck and operatively connected as above described, if it is desired to effect an application of the brakes on the truck fluid under pressure is supplied through the pipes 51 to said mechanisms. The fluid pressure supplied through pipes 51 flows to the pressure chamber 46 in each mechanism and therein acts on the piston 43 to effect movement thereof in the direction of the vehicle wheel 1.

As the piston 43 is thus operated it shifts the non-rotatable brake element 26 along the rods 37 into engagement with the rotatable brake element 13. Upon such engagement the rotatable brake element 13 is picked up and moved along the torque pins 10 into engagement with the non-rotatable element 25 which is then picked up and moved along the rods 37 into contact with the rotatable brake element 12. The rotatable brake element 12 is then slipped along the torque pins 10 into contact with the non-rotatable element 24 which then in turn is moved on the rods 37 into engagement with the rotatable element 11 which is fixed against axial movement.

After the several annular brake elements are thus moved into frictional inter-engagement they are forced together with a pressure depending upon the pressure of fluid acting on the brake cylinder piston 43, as a result of which the non-rotatable brake elements create a drag on the rotatable brake elements, thereby effecting braking of said rotatable elements which is in turn transferred through the torque rings 7 and 15 and bolts 16 to the car wheel 1 for effecting braking of said wheel. The degree with which the rotatable elements and thereby the wheel 1 is braked, as just described, depends upon the pressure of fluid supplied to chamber 46 for acting on the brake cylinder piston 43 as will be evident.

During braking, the non-rotatable brake elements are held against turning by the connection including the telescoping rod 73 and sleeve 74 which provides a substantially rigid connection between the two brake mechanisms at one side of the truck against rotative movement relative to each other, and it will be noted that the tendency to turn the non-rotatable elements in one brake mechanism acts through this connection to counteract the tendency to turn the non-rotatable elements in the other mechanism, thereby further securing the non-rotatable brake elements in both brake mechanisms against rotation. Due to the pins 71 and telescopic connection between the rods 73 and sleeve 74 it will however be evident that the two brake mechanisms are free to move with the truck wheels 1 relative to each other in a direction longitudinally of the truck frame as well as transversely thereof.

When it is desired to effect a release of the brakes after an application, fluid under pressure is vented from the pressure chamber 46 in both mechanisms by way of the pipes 51, whereupon the release springs 52 acting on the non-rotatable brake elements and the release springs 23 and 23' acting on the rotatable brake elements are permitted to act to move all of said elements and the brake cylinder pistons 43 back to their release position in which the non-rotatable elements are disengaged from the rotatable elements, as before described.

*Operation of cooling arrangements*

Upon rotation of the rotatable brake elements 11, 12 and 13 the side walls of the slots 63 and 64, in the adjacent faces of said elements act as fan blades to draw air from chamber 65, which is open to the atmosphere through apertures 66, and expel such air through the outer peripheral surfaces of said elements to the atmosphere, while the side walls of the slots 64 in the face of the rotatable brake element 13 adjacent the non-rotatable element 26 acts in a like manner, except that such slots draw air from chamber 68 which is also open to the atmosphere. During braking when the several brake elements are in frictional interengagement, this flow of air through the slots 63 and 64 is adapted to dissipate heat, incident to braking, from said elements in order to maintain their temperature at a sufficiently low degree to provide efficient braking. It will be noted that this flow of air through the slots 63 and 64 is directly across or over the braking faces of the non-rotatable brake elements so as to provide efficient cooling thereof also. These slots also act during braking to receive any particles of metal torn from the braking faces of the brake elements or any other foreign material and to expel same through the outer ends of said slots to the atmosphere, so as to thereby maintain the braking faces of the several elements clean and capable of most intimate contact to provide the most efficient and uniform braking.

The polished face of the ring 50 acts during braking to reflect heat radiated thereto from the brake elements away from the brake cylinder device. Rotation of the fan blades 69 in chamber 68, which is open to the atmosphere through apertures 84 and 67, acts to force air out of said chamber through the space between the non-rotatable element 26 and brake cylinder device over both of the opposite faces of the ring 50 so as to carry away heat absorbed by said ring from the braking elements, thereby further minimizing the transfer of heat from the brake elements to the brake cylinder device so as to protect the lubricant and packing cup 45 in said device against such heat.

*Summary*

From the above description it will be evident that the improved brake mechanism, which is relatively simple and compact in construction, is particularly adapted for use on the modern stream-lined low type vehicles where spaces for the installation of brake mechanisms are very limited. The efficient cooling system provides for efficient braking operation of the mechanism even though located in a position where the flow of natural air currents over the brake mechanism incident to movement of the vehicle is greatly restricted or not present at all. An important feature is that the brake mechanism can be completely assembled before application to a vehicle wheel, which provides for more expeditious and convenient installation on a vehicle as well as replacement of the brake mechanism as a unit when such is necessary. Repair of the removed units can thus be effected at some central station equipped to do such work in a most efficient manner.

Another important feature is the connection provided between the non-rotatable brake elements in the two brake mechanisms for holding said elements against rotation and at the same time providing for relative movement between the two brake mechanisms in directions both longitudinally and transversely of the truck. It will be evident that due to this novel connection, braking of the truck is entirely independent of the truck frame.

While one illustrative embodiment of the invention has been described in detail it is not the invention to limit its scope to that embodiment or otherwise than by the terms of the appended claims.

Having now described our invention, what we claim as new and desire to secure by Letters Patent is:

1. A brake arrangement for two spaced wheel and axle assemblies of a railway vehicle truck, said assemblies being capable of limited movement relative to each other in a direction transversely of said truck, said brake arrangement comprising for each of said assemblies a brake mechanism including an annular rotatable friction brake element secured to rotate with the assembly, a non-rotatable friction brake element adapted to frictionally engage said rotatable element to effect braking of said assembly, and a non-rotatable structure having a journal connection with said assembly supporting said non-rotatable element, and a rigid structure having a vertically arranged pivotal connection at one end with the non-rotatable structure of one brake mechanism and having at the opposite end a like pivotal connection with the non-rotatable structure of the other brake mechanism, said rigid structure being operative to hold said non-rotatable structures and non-rotatable elements against rotation, said pivotal connections being provided to render said brake mechanisms movable relative to each other transversely of said truck, said rigid structure comprising two members having telescopic engagement providing for movement relative to each other in a direction longitudinally of said truck to render said brake mechanisms movable relative to each other longitudinally of said truck.

2. A brake arrangement for two spaced wheel and axle assemblies of a railway vehicle truck having a truck frame carried by said assemblies, said assemblies being capable of limited movement relative to each other in directions both transversely and longitudinally of said truck frame, said brake arrangement comprising for each of said assemblies a brake mechanism movable with the assembly relative to the truck frame, each brake mechanism comprising an annular rotatable friction brake element secured to rotate with the assembly, a non-rotatable friction brake element adapted to frictionally engage said rotatable element to effect braking of the assembly, restraining means independent of said truck frame and connecting the non-rotatable elements of the two brake mechanisms for holding said non-rotatable elements against rotation relative to each other, and means included in said restraining means for rendering said brake mechanisms movable with said assemblies and therefore relative to each other in directions both transversely and longitudinally of said truck frame.

JOSEPH C. McCUNE.
GEORGE K. NEWELL.